UNITED STATES PATENT OFFICE.

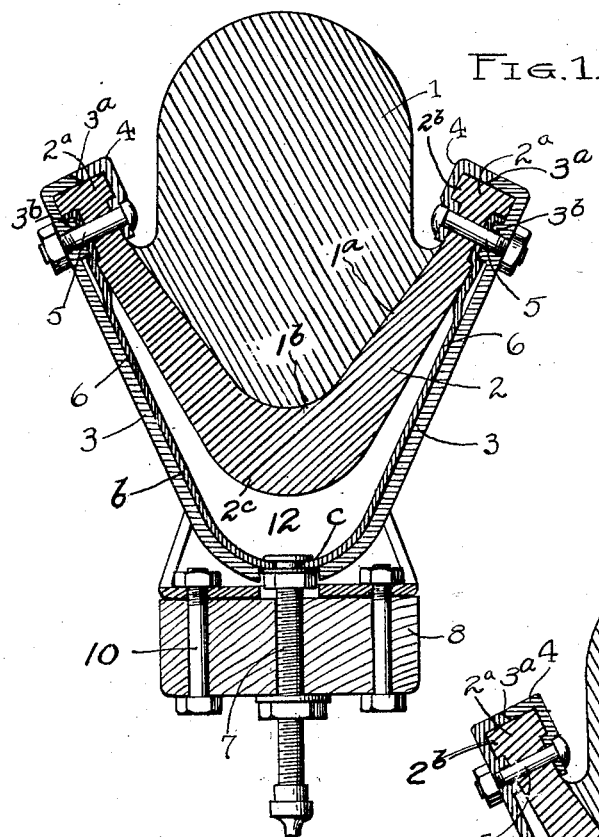
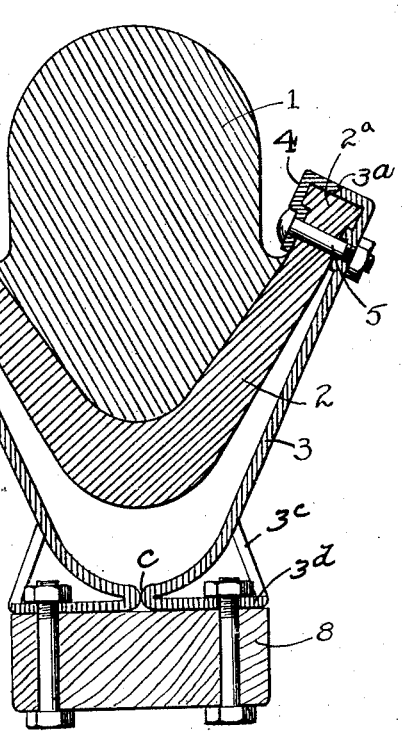
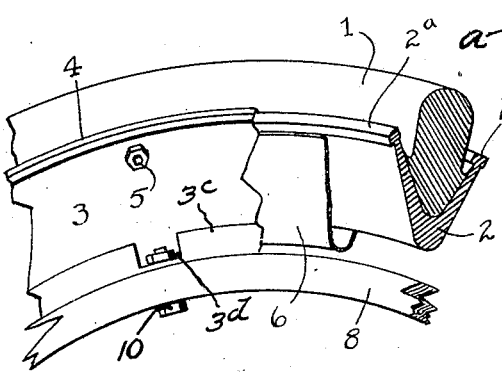

CLARENCE S. PRESTON, OF SAN DIEGO, CALIFORNIA.

VEHICLE TIRE.

1,408,714.　　　Specification of Letters Patent.　　Patented Mar. 7, 1922.

Application filed July 17, 1919. Serial No. 311,573.

*To all whom it may concern:*

Be it known that I, CLARENCE S. PRESTON, a citizen of the United States, residing at San Diego, in the county of San Diego and State of California, have invented certain new and useful Improvements in Vehicle Tires, of which the following is a specification.

My invention relates to a vehicle tire of the resilient type and the objects of my invention are: First, to provide a resilient tire in which the load is suspended on an elastic supporting member in the form of a stirrup or saddle, having diverging side portions which, under radial tension, serve to support a tread portion having converging inner surfaces, the side portions of the saddle being supported by flaring or diverging rim portions, to which they are attached at their opposite edges; second to provide a tire of this class with means for providing an air cushion between the elastic stirrup or saddle and the rim or load supporting portion of the tire, thus providing for both an air cushion and an elastic portion for supporting the load; third, to provide a tire of this class which is practically as resilient as a pneumatic tire and has all the general characteristics of operation of the same which will not puncture, become deflated or rim-cut.

Another object is to provide for so suspending a stirrup supporting member for the tread from the outer peripheral edges of the flaring portions of a rim supporting member that said stirrup support will not be worn or liable to be cut or weakened by vibration at its supporting portion, or by projecting parts, whereby it will be more durable and effective, also to provide an annular air cushion chamber between the stirrup member and the inner wall of said rim members, free from projection or obstructions, and thus further support the load.

Another object is to provide a rim support of approximately V-shape, composed of outwardly flaring parts or members, secured to the felloe and free from interior projections, and having outer peripheral edges which are clamped to the extended edges of a stirrup or saddle supporting member, so as to support and suspend the same and form an unobstructed air cushion space between said parts.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this specification in which:

Figure 1 is a transverse sectional view of my tire in its preferred form, shown mounted on a felloe; Fig. 2 is a perspective view of a fragmentary portion of the tire, showing portions broken away and in section to facilitate the illustration, and Fig. 3 is a transverse sectional view of my tire in a slightly modified form from that shown in Figs. 1 and 2 of the drawings, and shown mounted on a felloe.

Similar characters of reference refer to similar parts and portions throughout the several views of the drawings.

The tread portion 1, supporting stirrup 2, supporting rim portions 3, binding members 4, bolts 5, elastic flap member 6 and valve stem 7 constitute the principal parts and portions of my vehicle tire.

The tread portion 1 consists of resilient material preferably a rubber compound and shaped as shown best in the drawings and vulcanized, cemented or otherwise secured to a supporting stirrup member 2. This member is preferably made of a high grade elastic material, preferably rubber, which serves as a support for the load. This stirrup member 2 is provided at its opposite circumferential edges with enlarged annular portions $2^a$. These portions are somewhat T-shaped in cross section, that is, each has opposite annular side flanges $2^b$ for making secure connection with clamping members. Secured to stirrup member 2 are the supporting rim portions 3 which are annular members adapted to suspend and support the V-shaped member 2, and extend past and over the outer enlarged circumferential edges $2^a$ thereof to near the middle line where they terminate in beveled edges $3^a$. These members 3 are provided with inwardly extending annular flanges $3^b$ which are adapted to be pressed into the member 2 just inside one of the flanges $2^b$, for holding said members 2 and 3 in their certain relative positions to each other and making a tight joint. Mounted on the opposite or inner sides of the extended edge portions $2^a$, on both sides of the tread 1, are the annular binding or clamping ring members 4, each shaped with an offset or shoulder to fit under the side flange 2ᵇ, their outer overlapping edges being beveled and projecting over the beveled edges 3ᵃ of the rim members 3 for making a tight smooth joint when the members are drawn together, as shown in Figs. 1 and 2. These members 3 and 4 are drawn together and held in their relative positions and clamp over the portions 2 and 2ᵃ by means of the bolts 5. The rim 3 may be conveniently made of two annular parts, $a$ and $b$, each having an inwardly curved inner portion and an outwardly turned up bracing flange 3ᶜ, having cut away portions at 3ᵈ for receiving the fastening bolts 10, which pass through the flat part at 3ᵈ and the felloe 8. The two parts of the rim meet centrally at $e$, Fig. 3, on the felloe and abut, so as to make substantially a tight joint. The flare or inclination of the rim members does not coincide with that of the inner surfaces of the stirrup 2, but is less obtuse and they are of such a width as to provide an air cushion chamber 12, of approximately V-shape, between the members 2 and 3, but being deepest centrally, adjacent to the felloe. This cushion helps to sustain the load and exercises a cushioning effect on the whole inclined inner surfaces of the stirrup member 2. In the preferred form of construction there is provided an elastic and resilient flap member 6, which fits the inner surface of the parts $a$ and $b$ members 3 and extends down between the members 2 and 3 at opposite sides and is clamped at its outer edges between said members by means of the bolts 5, in Fig. 1 and the outward edges of the flap 6 are cemented or vulcanized to the extended edges of member 2, forming an air tight joint between said members. Mounted in said flap member and the rim and extending through the felloe is a valve stem 7 which may be of the conventional type adapted for the introduction of air between the flap member 6 and the member 2, thus forming an air cushion 12 of any desired pressure between the rim 3 and the member 2, which serves as an additional support for the load and assists the member 2 in supporting the load, being particularly effective where the vehicle is stored or standing for a considerable length of time, and serving to take the strain off of the stirrup member 2. The tread portion 1 of the tire is preferably made with inner inclined surfaces 1ᵃ, diverging from a curved middle part 1ᵇ, upward and outward, or in other words converging from the sides to the middle portions, for fitting the supporting stirrup or saddle 2, having the same outer conformation. The stirrup or saddle preferably has a thickened curved middle part 2ᶜ, for giving it greater strength in the line of thrust of the tread portion. This stirrup or saddle is approximately V-shaped in cross section, with a wide curved lower end, and upwardly diverging walls, as shown, for giving it greater strength to resist wear and vibration caused by the constant motion and jar of the wheel in travel. This is quite important in practice and adds greatly to the life of the tire. The diverging parts of the stirrup or saddle being nearly vertical will be very little affected by the up and down motion of the wheel during rotation, and will not, therefore, break transversely, as will a transversely flat or nearly flat band or belt which has been proposed in a tire construction. Under a load, and especially during travel, the pressure of the tread portion may have a tendency to slightly draw inward the extended edges of the saddle and rim portions and thus tighten the parts and better resist vibration, wear, and strain. Since the saddle is suspended from, and supported by, the outwardly diverging rim portions, a clear air cushion space 12 is provided for further supporting the saddle, and such space can therefore be made free from projections or obstructions which would cut or wear the saddle.

In the modified form of construction shown in Fig. 3 of the drawings the flap member 6 and valve stem 7 are eliminated, the structure otherwise being the same.

It will be noted that a considerable air space 12 is left between the members 2 and 3 to permit movement of the members 1 and 2 relatively to the rim supports 3 in case an obstruction is run over by the tread portion. It is to be noted that the member 2 is of sufficient strength to support the load under tension under ordinary conditions as shown in Fig. 3 of the drawings.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a tire structure in which the load is suspended upon the elastic stirrup portion under tension and that this same elastic stirrup portion, V-shaped in cross section, supports the tire for side thrust, for going around curves and the like, and that in the preferred form of construction there is provided an air cushion to assist in supporting the load both for load carrying and side thrust.

The elastic diverging portions of the stirrup or saddle will in use practically be under longitudinal or radial tension, rather than transverse tension, as would a transversely flat, band or belt, and therefore, less liable to crack under vibration imparted by the wheel in motion or travel over a roadway.

A vehicle tire comprising a tread portion provided with oppositely disposed, outwardly inclined elastic extended portions or tension flanges, and load carrying supports or rim members secured thereto at their outer edges, and a felly to which said supports are secured, or such a construction wherein the felly is disposed in spaced relation to said tread portion or member, is not claimed herein, as such matter is made the subject of claims in my copending application, Serial Number 297,181.

Having thus described my invention what I claim as new and desire to secure by Letters Patent, is:

1. In a vehicle tire of the class described, the combination with a tread member provided with converging inner circumferential surfaces, of an elastic supporting saddle member, having outwardly diverging portions applied to said surfaces and provided with edge extensions, and a load carrying rim having diverging annular side portions of a greater width and a different divergence from the side portions of the saddle, so as to provide an air space between the rim and saddle portions, an elastic annular flap between said portions, the edges of the rim, and edges of the flap being secured to said extensions of the saddle, and means for supplying air to the space between the flap and the saddle member, whereby the load will be supported by the diverging portions of the saddle under tension, and by an air cushion, for the purpose described.

2. In a vehicle tire of the class described, the combination with a tread member, of an elastic supporting saddle member, approximately V shaped in cross section, applied to the tread member for supporting it against side thrusts, and having enlarged outer edges a rim having diverging side portions provided at their inner portions with outwardly turned up bracing flanges, a felloe, bolts securing said flanges to the felloe, said side portions having near their outer edges inwardly projecting annular flanges exending partly over the enlarged edges of the saddle, clamping rings fitted to the inner faces and partly over said outer edges, and bolts for drawing the parts together and making tight joints.

In testimony whereof, I have hereunto set my hand at San Diego California this 11th day of July 1919.

CLARENCE S. PRESTON.